United States Patent [19]

Perks et al.

[11] Patent Number: 5,764,960
[45] Date of Patent: Jun. 9, 1998

[54] METHOD AND SYSTEM FOR SHARING A MENU BY MULTIPLE COMPONENTS IN A COMPONENT-BASED COMPUTER SYSTEM

[75] Inventors: Michael Albert Perks, Lake Worth; Sally M. Tekulsky, Pompano Beach, both of Fla.; Shirley L. Martin, Austin, Tex.

[73] Assignee: International Business Machines Corporation, Armonk, N.Y.

[21] Appl. No.: 593,945

[22] Filed: Jan. 30, 1996

[51] Int. Cl.$^6$ ............................................. G06F 7/10
[52] U.S. Cl. .............................. 395/500; 395/353
[58] Field of Search .......................... 395/500, 777, 395/778, 788, 803, 792, 793, 347, 352, 353, 522, 523, 326, 333, 335, 338

[56] References Cited

U.S. PATENT DOCUMENTS

| 4,933,880 | 6/1990 | Borgendale et al. ............ 395/777 |
| 4,974,194 | 11/1990 | Barker et al. .................. 395/803 |
| 4,984,152 | 1/1991 | Muller . | |
| 5,119,475 | 6/1992 | Smith et al. . | |
| 5,311,422 | 5/1994 | Loftin et al. . | |
| 5,384,910 | 1/1995 | Torres . | |
| 5,404,435 | 4/1995 | Rosenmaum ................... 395/777 |
| 5,423,023 | 6/1995 | Batch et al. . | |
| 5,537,526 | 7/1996 | Anderson et al. ............... 395/777 |
| 5,640,579 | 6/1997 | Koppolu et al. ................ 395/788 |

OTHER PUBLICATIONS

IBM Technical Disclosure Bulletin, vol. 31, No. 1, Jan. 1995, "Graphical User Interface for the Distributed Computing Enviroment".

IBM Technical Disclosure Bulletin, vol. 38, No. 9, Sep. 1995, "Setup Program Configuration Interface for Personal Computers".

*Primary Examiner*—Kevin J. Teska
*Assistant Examiner*—Dan Fiul
*Attorney, Agent, or Firm*—Mark S. Walker; Antony P. Ng; Andrew J. Dillon

[57] ABSTRACT

In a component-based system such as OpenDoc, only one component can be "active," such that only the active component has control of the menubar and the pop-up menus. An active component may contain both intrinsic contents and embedded components. The active component allows the user to "select" some or all of its embedded components such that the user can act on the selected embedded components. When the selection is an intrinsic content, it is straightforward for the active component to present menu options that allows the user to interact with the selection. However, when the selection is an embedded component, there is no standard method for presenting menu options that allows the user to interact with selected embedded component; especially when multiple embedded components are selected within a compound document. This invention provides a method for sharing a menu by multiple embedded components in a component-based computer system.

11 Claims, 8 Drawing Sheets

METHOD AND SYSTEM FOR SHARING A MENU BY MULTIPLE COMPONENTS IN A COMPONENT-BASED COMPUTER SYSTEM

BACKGROUND OF THE INVENTION

1. Technical Field

The present invention relates in general to a method and system for data processing, and in particular to a method for processing a graphical user interface within a computer system. Still more particularly, the present invention relates to a method for sharing a menu by multiple components in a component-based computer system.

2. Description of the Prior Art

Computers are being utilized to handle more and more complex tasks nowadays, and these tasks often require a simultaneous utilization of a variety of programs, each program being capable of handling a certain type of medium. To that end, a new model for software interoperability called OpenDoc, which is sponsored by Component Integration Laboratories, an independent industry association including 19 members such as International Business Machines Corporation and Apple Computer, Inc., was developed to allow for the creation of cross-platform component software. In essence, OpenDoc fundamentally changes the meaning of the term "document." Traditionally, a document has a type, which is tied to an application that a user must work with in order to view, edit, and print its content. With OpenDoc, however, a document is no longer a single block of content bound to a single application. Instead, it is composed of smaller blocks of content called components, which can be edited interactively.

Components are the basic building blocks in OpenDoc, replacing the traditional model of monolithic applications with smaller blocks of content and related functionalities. For example, text components contain characters; graphic components contain lines, shapes and images; spreadsheet components contain spreadsheet cells with formulae; and video components contain digitized video. Components, which are simpler and more focused than general-purpose applications, can be mixed and matched to fit the task at hand, and each component includes the ability to edit its particular type of content.

Under OpenDoc, a compound document may contain several different components such as a text component, a graphic component, and a photo component. If a user wants to edit the text, the user may simply select some text within the text component with a cursor, and a text editor will be invoked automatically. Or, if the user wants to modify the graphic, the user may select some portion of the graphic with a cursor, and a graphic editor will be invoked for that purpose. The user can choose his or her favorite OpenDoc-based editor for each component because the whole document is based on the OpenDoc architecture. All the components within the document work together seamlessly and the document will appear to the user as if he or she is using a single application.

In a component-based system having a software architecture such as OpenDoc, only one component can be "active," such that only the active component has control of the menubar, typically located at the top of the screen, and the pop-up menus, which may appear on any part of the screen. When the user has finished interacting with one component, a new component may be made active such that a new set of menu options comes into effect.

Within an active component, there can exist both intrinsic contents (e.g., text in a word processing component) and embedded components. The active component may allow the user to "select" some or all of its embedded components such that the user can act on the selected components. When the selection is an intrinsic content, it is straightforward for the active component to present menu options that allow the user to interact with the selection. However, when the selection is an embedded component, there is no standard method for presenting menu options that allow the user to interact with the selected embedded component; especially when there is a multiple selection of embedded components within a compound document.

Consequently, it would be desirable to provide a method for sharing a menu by multiple embedded components in a component-based computer system.

SUMMARY OF THE INVENTION

In view of the foregoing, it is therefore an object of the present invention to provide an improved method for data processing.

It is another object of the present invention to provide an improved method for processing graphical user interfaces within a computer system.

It is yet another object of the present invention to provide a method for sharing a menu by multiple embedded components in a component-based computer system.

In accordance with the method and system of the present invention, a user first selects at least one embedded component from within an active component. In response to the selection of one or more of the embedded components, the process determines whether any one of the selected component(s) contains a menu extension. If none of the selected component(s) contains a menu extension, the process attaches options from the active component to the graphical user interface menu and then displays the graphical user interface menu. However, if any one of the selected components contains a menu extension, the process then further determines whether there is more than one type of menu extension. If there is only one type of menu extension, the process first obtains the menu extension from the selected component(s), then attaches options from the menu extension to the graphical user interface menu, and finally displays the graphical user interface menu. But if there is more than one type of menu extension, the process first seeks options that are common to all of the selected components from the menu extensions, then attaches these options to the graphical user interface menu, and finally displays the graphical user interface menu.

All objects, features and advantages of the present invention will become apparent in the following detailed written description.

BRIEF DESCRIPTION OF THE DRAWINGS

The invention itself, as well as a preferred mode of use, further objects and advantage thereof, will best be understood by reference to the following detailed description of an illustrative embodiment when read in conjunction with the accompanying drawings, wherein.

DETAILED DESCRIPTION OF PREFERRED EMBODIMENT

The present invention may be implemented on a variety of computers under a number of different operating systems. The computer may be, for example, a personal computer, a mini-computer or a mainframe computer. The computer may be a stand-alone system or part of a network such as a local area network (LAN) or a wide area network (WAN). For the purpose of illustration, a preferred embodiment of the present invention as described below is implemented on a personal computer, such as the Aptiva™ series manufactured by International Business Machines Corporation, having a component-based software architecture such as Open-Doc. However, the present invention may be implemented in any other component-based software architecture.

Figure 1A:
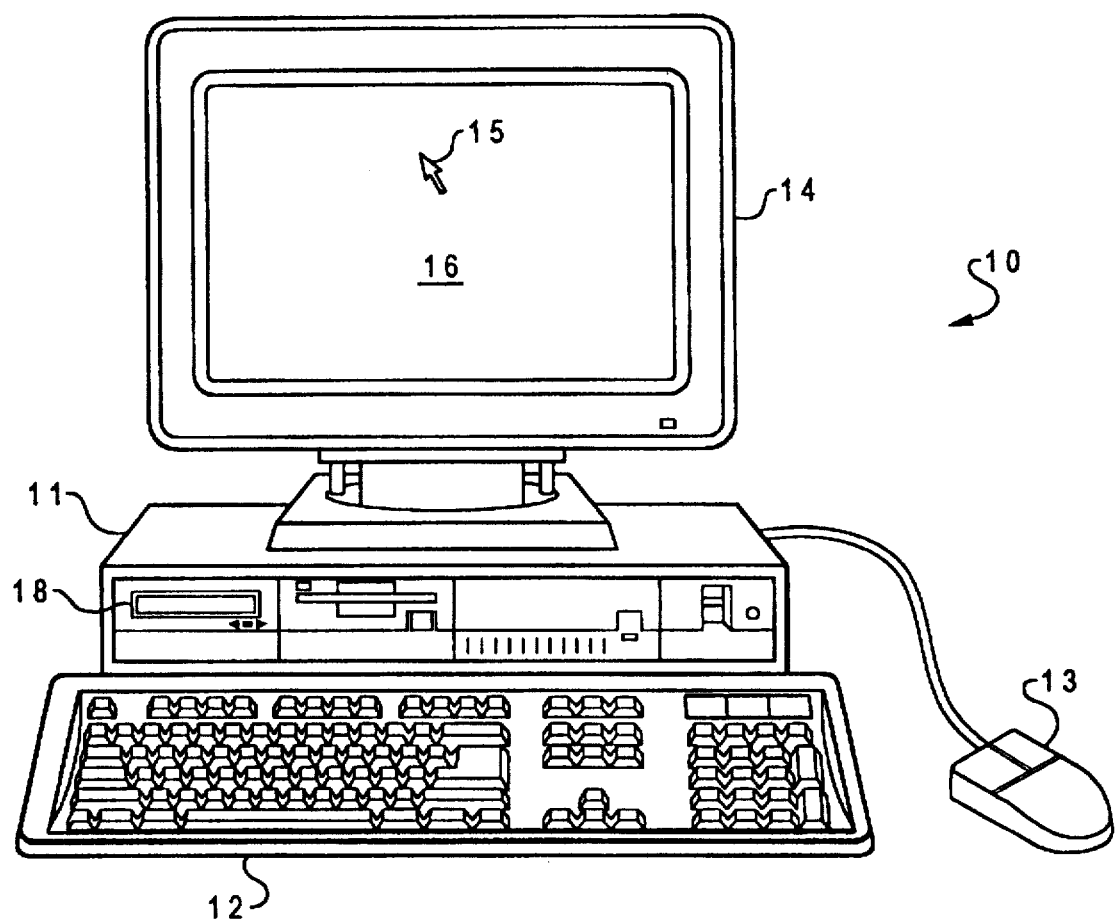
FIG. 1A is a pictorial diagram of a personal computer utilized by a preferred embodiment of the present invention.

Referring now to the drawings and in particular to FIG. 1A, there is depicted a diagram of personal computer 10 which utilizes an operating system having the present invention incorporated within. Personal computer 10 comprises processor unit 11, keyboard 12, mouse 13 and video display (or monitor) 14. Keyboard 12 and mouse 13 constitute user input devices, and video display 14 constitutes an output device. Mouse 13 is utilized to control cursor 15 displayed on screen 16 of video display 14. Personal computer 10 supports a Graphic User Interface (GUI) which allows a user to "point-and-shoot" by moving cursor 15 to an icon or specific location on screen 16 via mouse 13 and then depressing one of the buttons on mouse 13 in order to perform a user command.

Figure 1B:
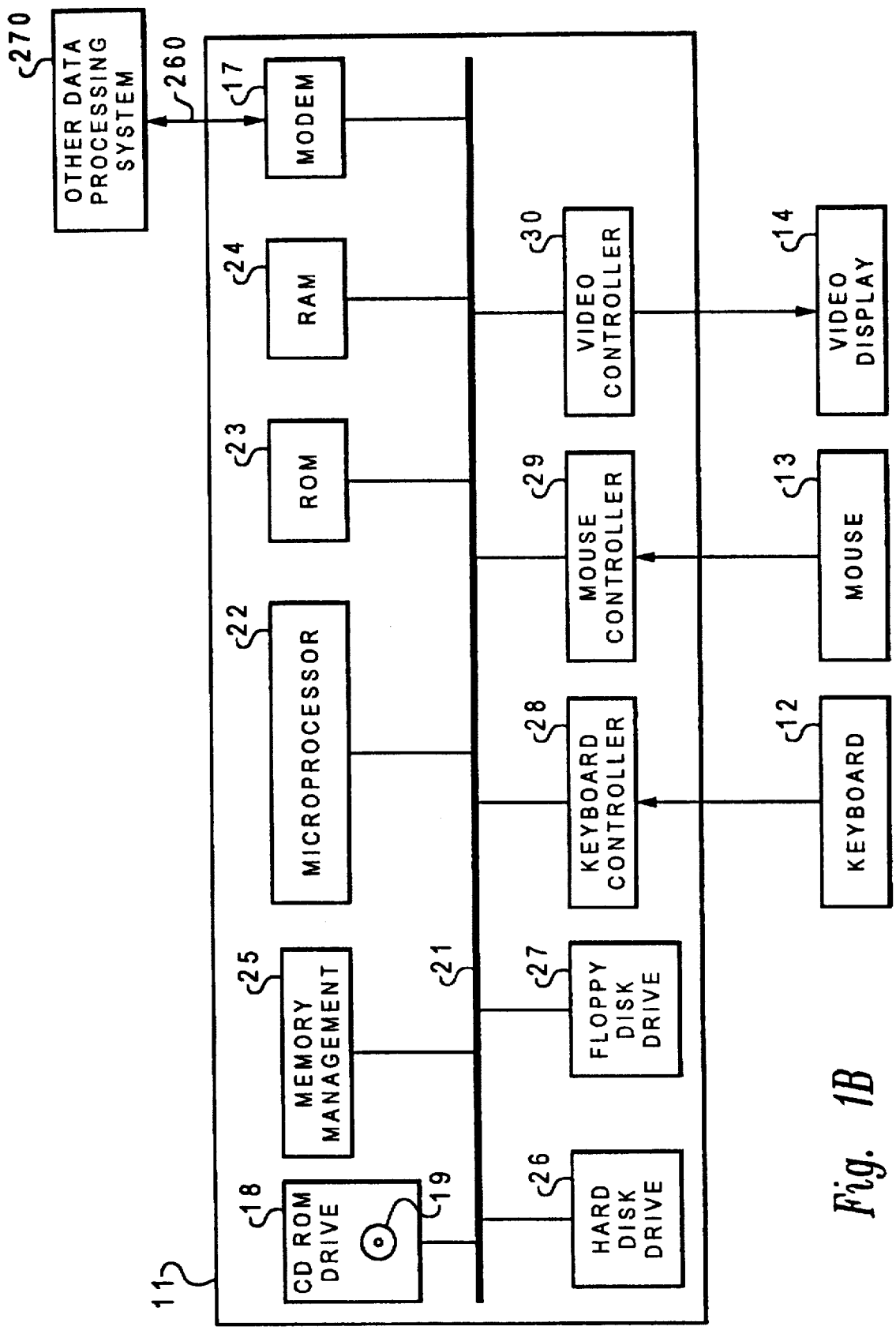
FIG. 1B is a functional block diagram of the personal computer depicted in FIG. 1A.

Referring now to FIG. 1B, there is illustrated a functional block diagram of personal computer 10 depicted in FIG. 1A. Processor unit 11 includes system bus 21 to which various functional blocks are attached and by which communications among various functional blocks are accomplished. Microprocessor 22, connecting to system bus 21, is supported by read only memory (ROM) 23 and random access memory (RAM) 24, both of which are also connected to system bus 21. Microprocessor 22 in the International Businesses Machines Corporation's Aptiva™ series of computers is one of the Intel® family of microprocessors, but other microprocessors manufactured by Hewlett Packard, Inc.; Sun Microsystems; Motorola, Inc.; and others may be applicable also.

ROM 23 contains, among other codes, the Basic Input/Output System (BIOS) which controls certain basic hardware operations, such as interactions of hard disk drive 26 and floppy disk drive 27. RAM 24 is the main memory within which the operating system having the present invention incorporated and other application programs are loaded. A memory management device 25 is connected to system bus 21 for controlling all Direct Memory Access (DMA) operations such as paging data between RAM 24 and hard disk drive 26 or floppy disk drive 27.

As shown in FIG. 1B, a CD ROM drive 18 having a compact disk 19 inserted inside is installed within processor unit 11. However, several other peripherals, such as optical storage media, printers, etc., may also be added to personal computer 10. Further, a modem 17 may be utilized to communicate with other data processing systems 270 across communications line 260.

To complete the description of processor unit 11, there are three input/output (I/O) controllers, namely, keyboard controller 28, mouse controller 29 and video controller 30, all of which are connected to system bus 21. As their names imply, keyboard controller 28 provides the hardware interface for keyboard 12, mouse controller 29 provides the hardware interface for mouse 13, and video controller 30 provides the hardware interface for video display 14. The FIGS. 1A and 1B is typical but may vary for a specific application.

Figure 2:
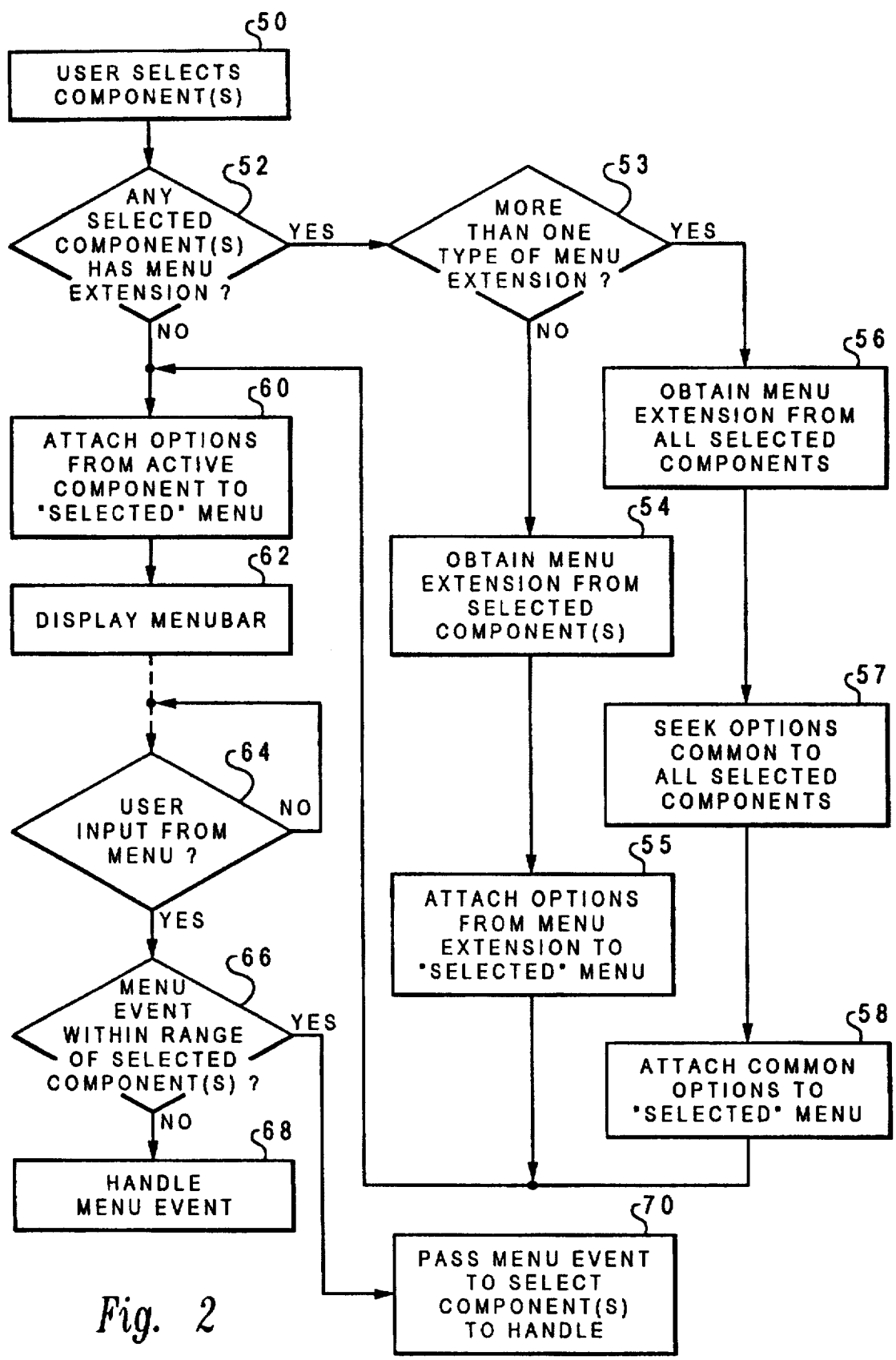
FIG. 2 is a high-level logic flow diagram of the method for sharing a menu by multiple embedded components according to a preferred embodiment of the invention.

In the OpenDoc architecture, only one component can be "active" at any time, and there may be one or more embedded components within the active component. With reference now to FIG. 2, there is illustrated a high-level logic flow diagram of the method for sharing a menu by multiple embedded components according to a preferred embodiment of the invention. Starting at block 50, a user first selects one or more of the embedded components within the active component, for example by moving cursor 15 over each embedded component to select such. A determination is then made at block 52 as to whether each selected component within the active component has a menu extension associated therewith.

If there is no menu extension associated with any of the selected components, the process proceeds to block 60. However, if there is a menu extension stored within any one of the selected components, a further determination is then made as to whether there is more than one type of menu extension at block 53. If there is only one type of menu extension, the process, at block 54, may then obtain the menu extension from any one of the selected component(s). The options from the menu extension are subsequently attached to a "Selected" menu on the menubar of a graphical user interface at block 55. The process then proceeds back to block 60. However, if there is more than one type of menu extension, the process first, at block 56, obtains the menu extensions from all the selected components, and then, at block 57, seeks out the menu options, from the menu extensions, that are common for all the selected components. The common options from the menu extension are subsequently attached to the "Selected" menu on the menubar of a graphical user interface at block 58. The process then proceeds back to block 60.

At block 60, the options from the active component are attached to the graphical user interface menubar, and the combined menubar is displayed on screen 16, at block 62. This concludes the method for sharing a menu by multiple selected components in a component-based computer system.

To continue with the high-level logic flow diagram of FIG. 2, there is illustrated a preferred method of handling the options within the combined menubar. A determination is first made at block 64 as to whether the user has made an input via the "Selected" menu of the combined menubar. If the user has not made an input via the "Selected" menu, then the process loops back to block 64. However, if the user has made an input via the "Selected" menu, then a determination is made, at block 66 as to whether the menu event is within the range of the selected component(s). If the menu event is within the selected component range, then the process passes the menu event to a selected component to handle at block 70; otherwise, the process handles the menu event itself at block 68.

Figure 3:
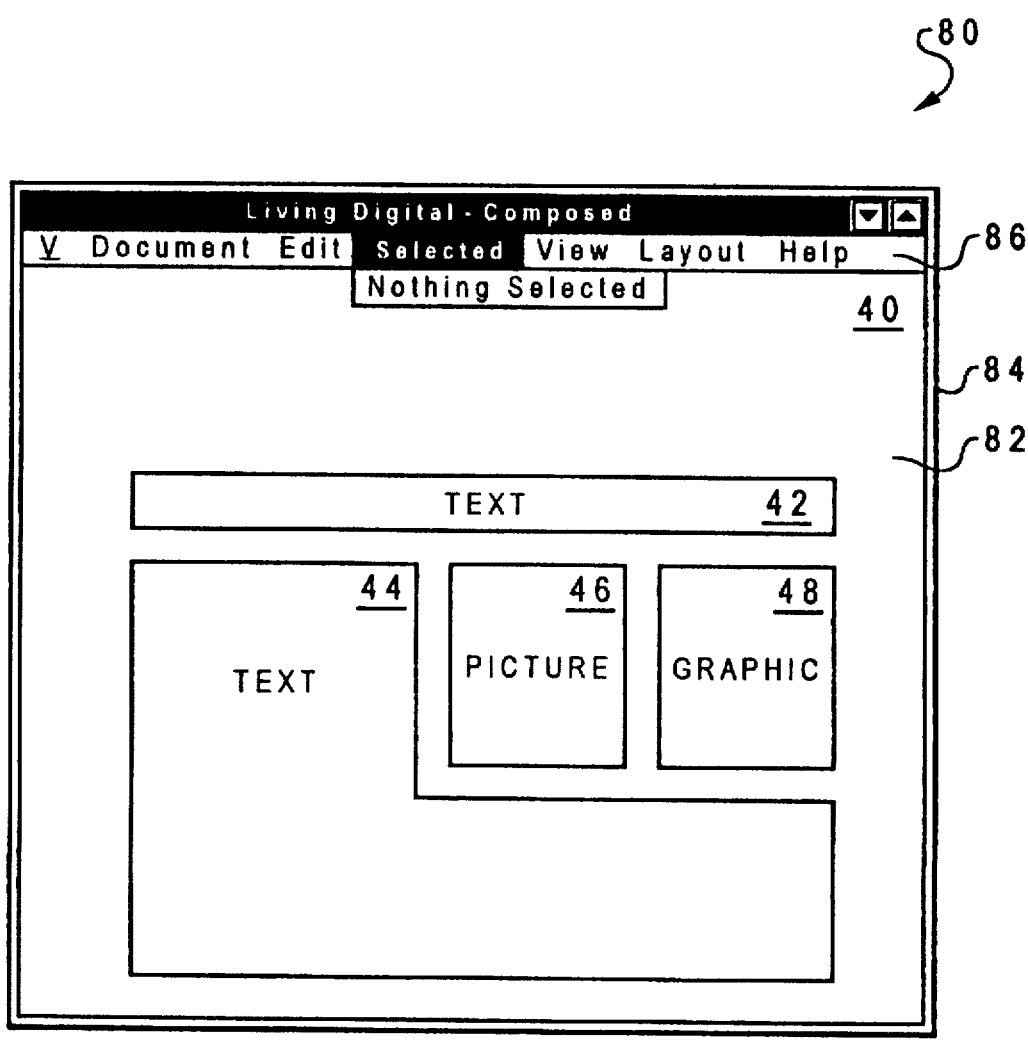
FIG. 3 is a pictorial representation of a menu-formatted graphical user interface having nothing selected.

Referring now to FIG. 3, there is illustrated a pictorial representation of a menu-formatted graphical user interface 80. Menu-formatted graphical user interface 80 is depicted in workspace 82 of screen 16 of personal computer 10. Workspace 82 is defined by window 84. While a single workspace is depicted in the view of FIG. 3, the present invention may be utilized in a multiple workspace environment, including a multi-tasking environment with multiple overlapping windows displayed on screen 16 of personal computer 10. As shown, several menu choices are disposed within menubar 86 of menu-formatted graphical user interface 80. The menu choices include a "Document" menu, an "Edit" menu, a "Selected" menu, a "Layout" menu and a "Help" menu. In addition, there are several embedded components, including text a "Selected" menu, a "Layout" menu and a "Help" menu. In addition, there are several embedded components, including text components 42, 44, picture component 46 and graphic component 48, within an active component 40. As shown, there is no embedded component being selected and, hence, the "Selected" menu shows "Nothing Selected" as an only option.

Figure 4:
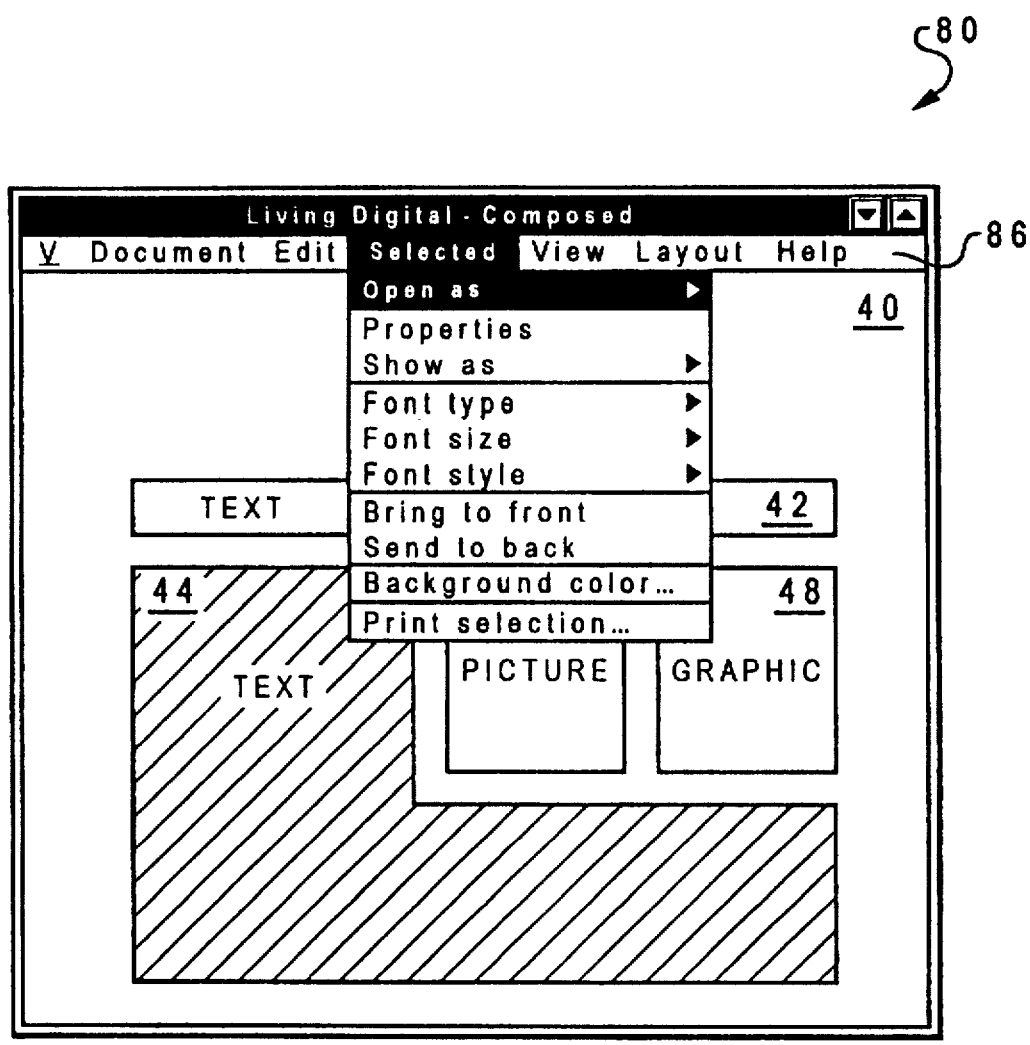
FIG. 4 is a pictorial representation of a menu-formatted graphical user interface having a text component selected.

With reference now to FIG. 4, there is illustrated a pictorial representation of a menu-formatted graphical user interface 80 having text component 44 selected (shaded area). Thus, only options from text component 44, such as "Font type," "Font size" and "Font style" are attached to the "Selected" menu within menubar 86 of menu-formatted graphical user interface 80. In addition, options from active component 40, such as "Bring to front" and "Send to back," are also attached to the "Selected" menu within menubar 86 of menu-formatted graphical user interface 80.

Figure 5:
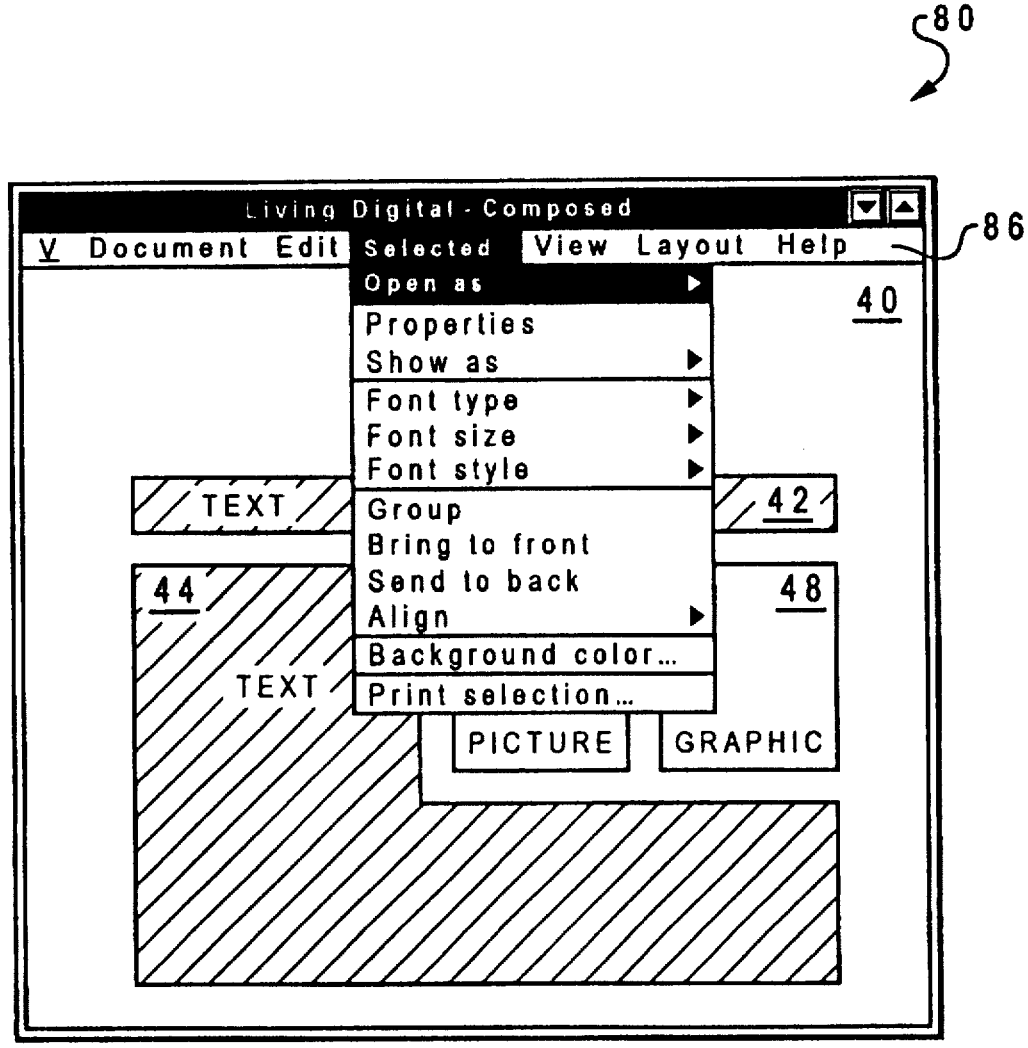
FIG. 5 is a pictorial representation of a menu-formatted graphical user interface having two text components selected.

Referring now to FIG. 5, there is illustrated a pictorial representation of a menu-formatted graphical user interface 80 having text component 42 and text component 44 selected. Thus, options from either on of text components 42, 44 are attached to the "Selected" menu within menubar 86 of menu-formatted graphical user interface 80. Because both components are text components, hence, the same three options—"Font type," "Font size" and "Font style"—that are applicable for text components are attached to the "Selected" menu. Further, options from active component 40, such as "Group," "Bring to front," "Send to back" and "Align", are attached to the "Selected" menu. Options "Group" and "Align" appear only when multiple components are selected.

Figure 6:
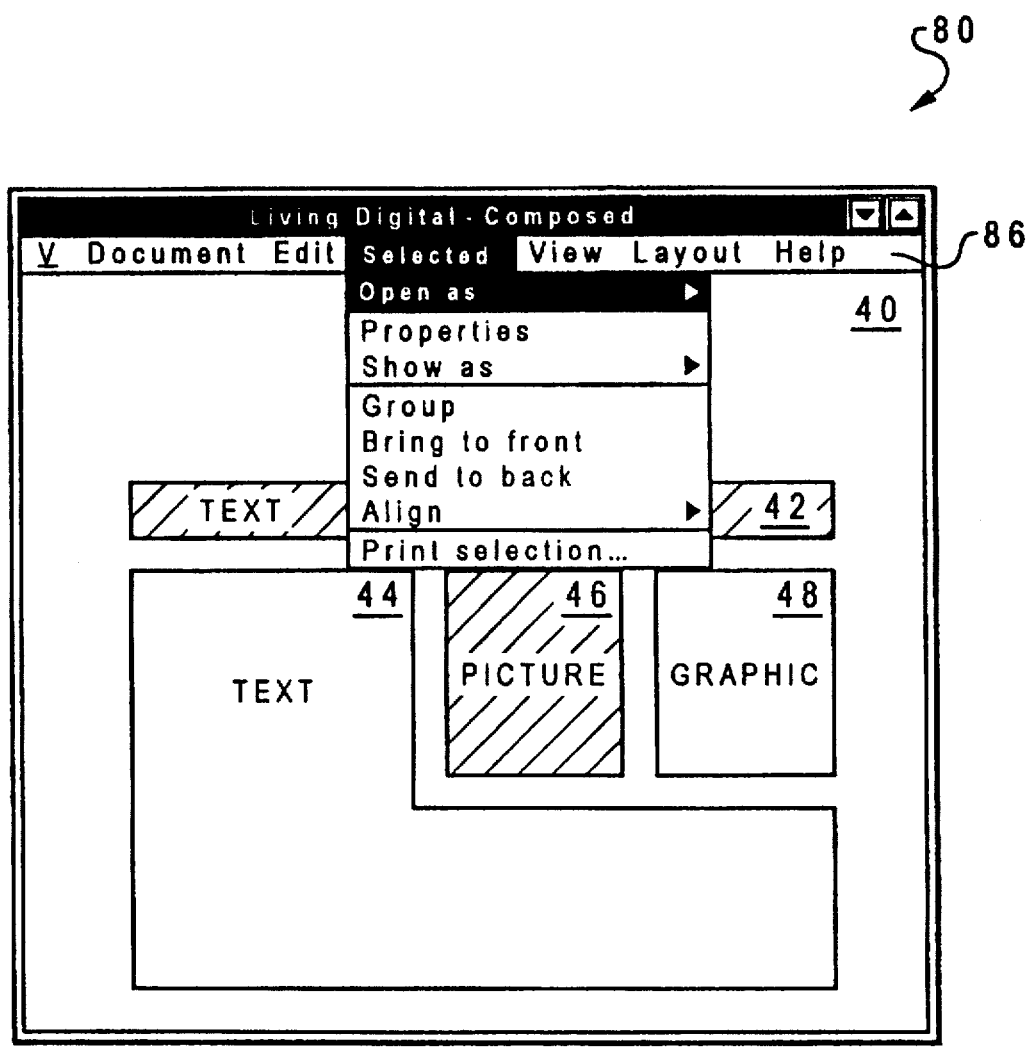
FIG. 6 is a pictorial representation of a menu-formatted graphical user interface having a text component and a picture component selected.

With reference now to FIG. 6, there is illustrated a pictorial representation of a menu-formatted graphical user interface 80 having text of these options (i.e., options that are common to both text component 42 and picture component 46) are attached to the "Selected" menu within menubar 86 of menu-formatted graphical user interface 80. Again, options from active component 40, including "Group" and "Align," are attached to the "Selected" menu because multiple components are selected.

Figure 7:
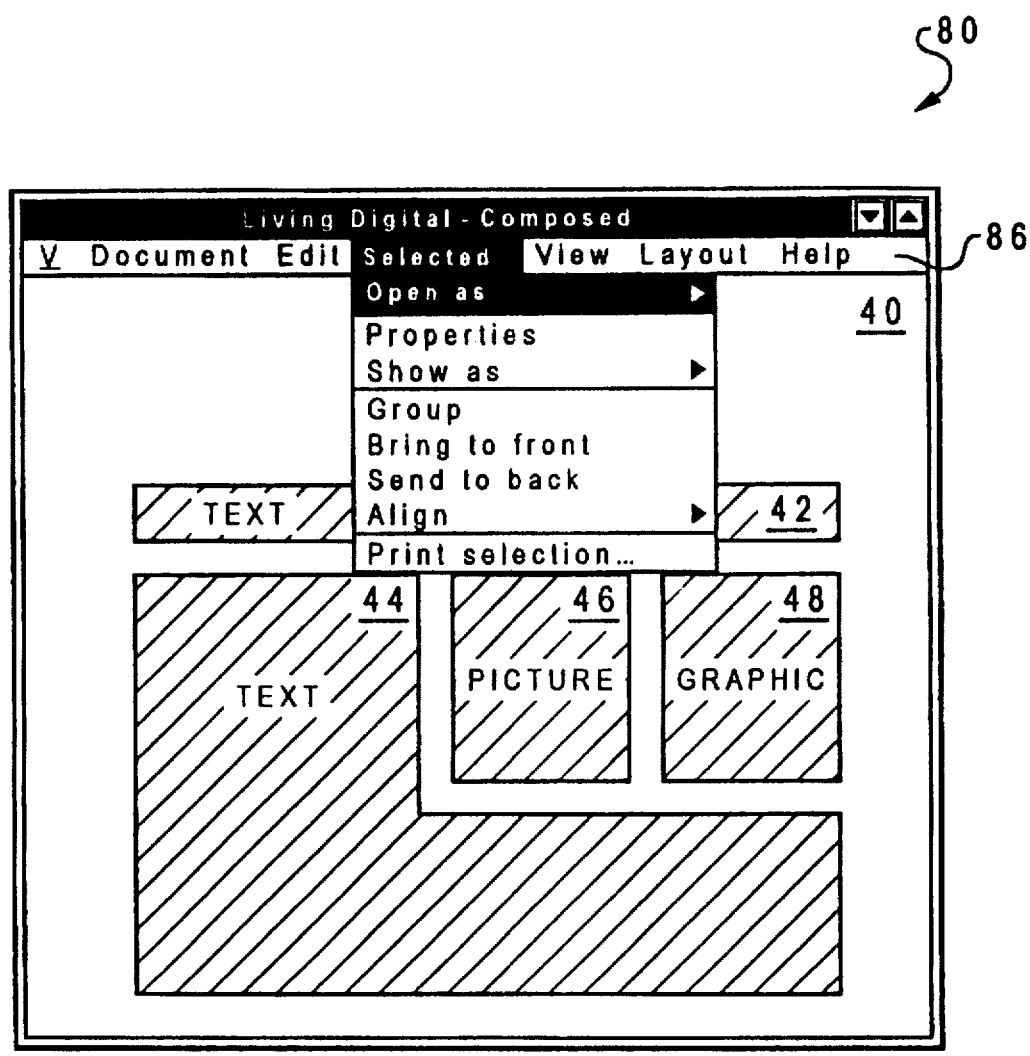
FIG. 7 is a pictorial representation of a menu-formatted graphical user interface having all the embedded components selected.

Referring now to FIG. 7, there is illustrated a pictorial representation of a menu-formatted graphical user interface 80 having all the embedded components selected. The options in the "Selected" menu in this case are exactly the same as in FIG. 6 because the intersection of all the four components options is the same as before.

As has been described, the present invention provides a method for sharing a menu by multiple embedded components within a component-based computer system.

While the invention has been particularly shown and described with reference to a preferred embodiment, it will be understood by those skilled in the art that various changes in form and detail may be made therein without departing from the spirit and scope of the invention.

What is claimed is:

1. A method for sharing a graphical user interface menu by multiple embedded components in a component-based computer system, said method comprising the steps of:

in response to a selection of one or more of said embedded components within an active component by a user, determining whether any of said selected embedded components has a menu extension associated therewith;

in response to a determination that none of said selected embedded components has a menu extension associated therewith, attaching options from said active component to said graphical user interface menu and displaying said graphical user interface menu;

in response to a determination that at least one of said selected embedded components has a menu extension associated therewith, determining whether there is more than one type of menu extension among all of said selected embedded components;

in response to a determination that there is only one type of menu extension among all of said selected embedded components:

obtaining said menu extension from any one of said selected embedded components, attaching options from said menu extension to said graphical user interface menu, attaching options from said active component to said graphical user interface menu, and displaying said graphical user interface menu; and in response to a determination that there is more than one type of menu extension among all of said selected embedded components:

seeking options from each menu extension that are common to all of said selected embedded components, attaching said common options to said graphical user interface menu, attaching options from said active component to said graphical user interface menu, and displaying said graphical user interface menu.

2. The method for sharing a graphical user interface menu by multiple embedded components in claim 1, wherein said attaching options from said active component step includes attaching a "Bring to front" option from said active component.

3. The method for sharing a graphical user interface menu by multiple embedded components in claim 1, wherein said attaching options from said active component step includes attaching a "Send to back" option from said active component.

4. The method for sharing a graphical user interface menu by multiple embedded components in claim 1, wherein said obtaining said menu extension from any one of said selected embedded components step includes obtaining said menu extension from a text component.

5. The method for sharing a graphical user interface menu by multiple embedded components in claim 1, wherein said obtaining said menu extension from any one of said selected embedded components step includes obtaining said menu extension from a graphic component.

6. The method for sharing a graphical user interface menu by multiple embedded components in claim 1, wherein said obtaining said menu extension from any one of said selected embedded components step includes obtaining said menu extension from a picture component.

7. A component-based computer system for sharing a graphical user interface menu by multiple embedded components, said system comprising:

means for determining whether any of said selected embedded components has a menu extension associated therewith, in response to a selection of one or more of said embedded components within an active component by a user;

means for attaching options from said active component to said graphical user interface menu and displaying said graphical user interface menu, in response to a determination that none of said selected embedded components has a menu extension associated therewith;

means for determining whether there is more than one type of menu extension among all of said selected embedded components, in response to a determination that at least one of said selected embedded components has a menu extension associated therewith;

means for obtaining said menu extension from any one of said selected embedded components, attaching options from said menu extension to said graphical user interface menu, attaching options from said active component to said graphical user interface menu, and displaying said graphical user interface menu, in response to a determination that there is only one type of menu extension among all of said selected embedded components; and means for seeking options from each menu extension that are common to all of said selected embedded components, attaching said common options to said graphical user interface menu, attaching options from said active component to said graphical user interface menu, and displaying said graphical user interface menu, in response to a determination that there is more than one type of menu extension among all of said selected embedded components.

8. The component-based computer system for sharing a graphical user interface menu in claim 7, wherein said embedded components includes a text component.

9. The component-based computer system for sharing a graphical user interface menu in claim 7, wherein said embedded components includes a graphic component.

10. The component-based computer system for sharing a graphical user interface menu in claim 7, wherein said embedded components includes a picture component.

11. A computer program product residing on a computer usable medium for sharing a graphical user interface menu by multiple embedded components in a component-based computer system, said computer program product comprising:

program code means for determining whether any of said selected embedded components has a menu extension associated therewith, in response to a selection of one or more of said embedded components within an active component by a user;

program code means for attaching options from said active component to said graphical user interface menu and displaying said graphical user interface menu, in response to a determination that none of said selected embedded components has a menu extension associated therewith;

program code means for determining whether there is more than one type of menu extension among all of said selected embedded components, in response to a determination that at least one of said selected embedded components has a menu extension associated therewith;

program code means for obtaining said menu extension from any one of said selected embedded components, attaching options from said menu extension to said graphical user interface menu, attaching options from said active component to said graphical user interface menu, and displaying said graphical user interface menu, in response to a determination that there is only one type of menu extension among all of said selected embedded components; and program code means for seeking options from each menu extension that are common to all of said selected embedded components, attaching said common options to said graphical user interface menu, attaching options from said active component to said graphical user interface menu, and displaying said graphical user interface menu, in response to a determination that there is more than one type of menu extension among all of said selected embedded components.

* * * * *